United States Patent [19]

Chih-Chun

[11] Patent Number: 5,501,294

[45] Date of Patent: Mar. 26, 1996

[54] BRAKE OIL LEVEL SAFETY DEVICE FOR MOTOR VEHICLES

[76] Inventor: Lo Chih-Chun, 15-13F, No. 4, Hsi Ning South Road, Taipei, Taiwan

[21] Appl. No.: 364,813

[22] Filed: Dec. 27, 1994

[51] Int. Cl.⁶ .......................... B60K 28/10; B60T 17/18
[52] U.S. Cl. .................. 180/271; 188/1.11; 188/151 A; 340/450.1; 340/624
[58] Field of Search ...................... 180/271; 188/1.11 E, 188/151 A; 340/450.1, 450, 624, 623

[56] References Cited

U.S. PATENT DOCUMENTS

| | | | |
|---|---|---|---|
| 1,243,470 | 10/1917 | White | 180/271 |
| 1,854,571 | 4/1932 | Albertson | 180/271 |
| 2,162,174 | 6/1939 | Jones | 180/271 |
| 2,615,105 | 10/1952 | Whitney | 188/1.11 E |
| 2,811,600 | 10/1957 | Storck et al. | 340/450.1 |
| 3,546,667 | 12/1970 | Thomas | 180/271 |
| 3,593,271 | 7/1971 | Schrader | 340/450.1 |
| 3,656,101 | 4/1972 | Akeley | 180/271 |
| 3,659,113 | 4/1972 | Wagner | 180/271 |
| 3,914,735 | 10/1975 | Guillaume | 180/271 |
| 3,964,567 | 6/1976 | McGinty | 180/271 |

FOREIGN PATENT DOCUMENTS

| | | | |
|---|---|---|---|
| 1151020 | 1/1958 | France | 180/271 |
| 2028560 | 3/1980 | United Kingdom | 180/271 |

*Primary Examiner*—Karin L. Tyson
*Assistant Examiner*—Peter C. English

[57] ABSTRACT

A motor vehicle safety device including a microswitch connected in series between the ignition system and battery power supply of a motor vehicle, and a float device disposed in the brake oil cup of the oil brake system of the motor vehicle and actuated to switch off the microswitch when the level of the brake fluid in the brake oil cup of the oil brake system of the motor vehicle drops below a predetermined level.

2 Claims, 5 Drawing Sheets

BRAKE OIL LEVEL SAFETY DEVICE FOR MOTOR VEHICLES

BACKGROUND OF THE INVENTION

The present invention relates to a motor vehicle safety device for the oil brake system of a motor vehicle which automatically cuts off power supply from the ignition system when the fluid level of the brake fluid in the brake oil cup of the oil brake system of the motor vehicle drops below a critical level.

It is reported that many traffic accidents which were caused by brake failures happened because the drivers didn't know that the brake fluid had dropped below the safety critical level. According to tests, when the brake fluid in the brake oil cup of the oil brake system of a motor vehicle drops below 1/5 of the full fluid level, a brake failure will occur. Therefore, a possible traffic accident can be prevented if power supply is cut off from the ignition system when the brake oil drops below the safety critical level.

SUMMARY OF THE INVENTION,

It is one object of the present invention to provide a motor vehicle safety device which automatically cuts off power supply from the ignition system when the fluid level of the brake fluid in the brake oil cup of the oil brake system of the motor vehicle drops below a critical level. It is another object of the present invention to provide a motor vehicle safety device which is simple in structure and practical in use.

BRIEF DESCRIPTION OF THE DRAWINGS

FIG. 1 is a sectional view showing the brake oil level safety device for motor vehicles of the present invention installed in a brake oil cup;

FIG. 1A is a circuit diagram showing the microswitch of FIG. 1 switched on;

FIG. 3A is a circuit diagram of the present invention showing the microswitch switched on;

FIG. 5B is similar to FIG. 5A but showing the microswitch switched on.

DETAILED DESCRIPTION OF THE PREFERRED EMBODIMENT

Figures 1, 1A:
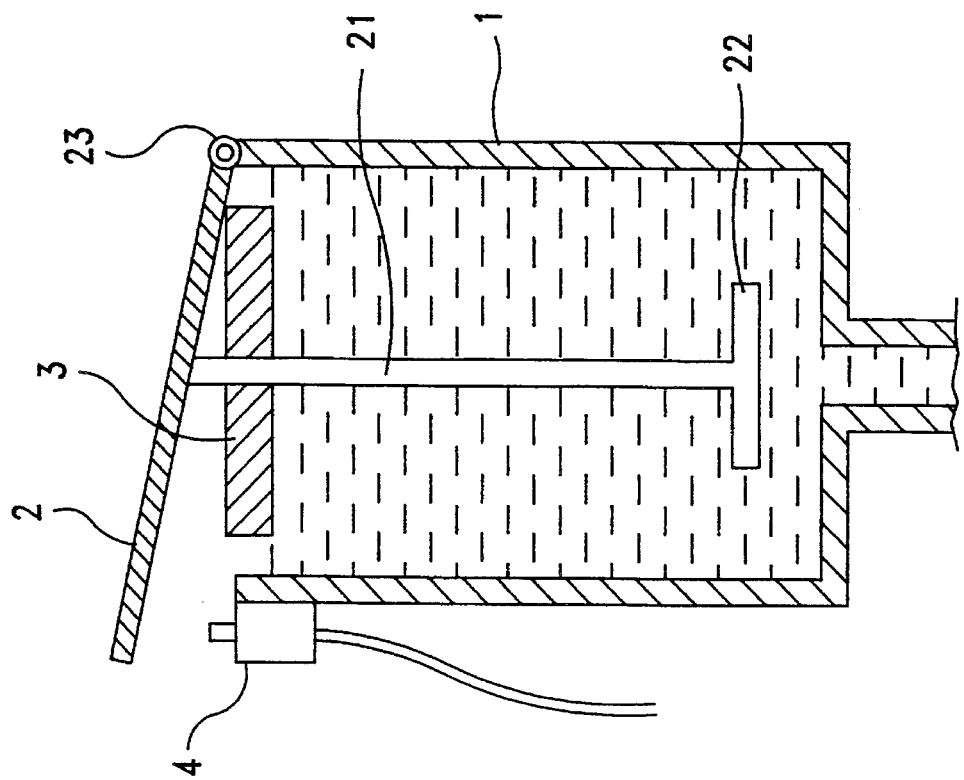
Figure 2:
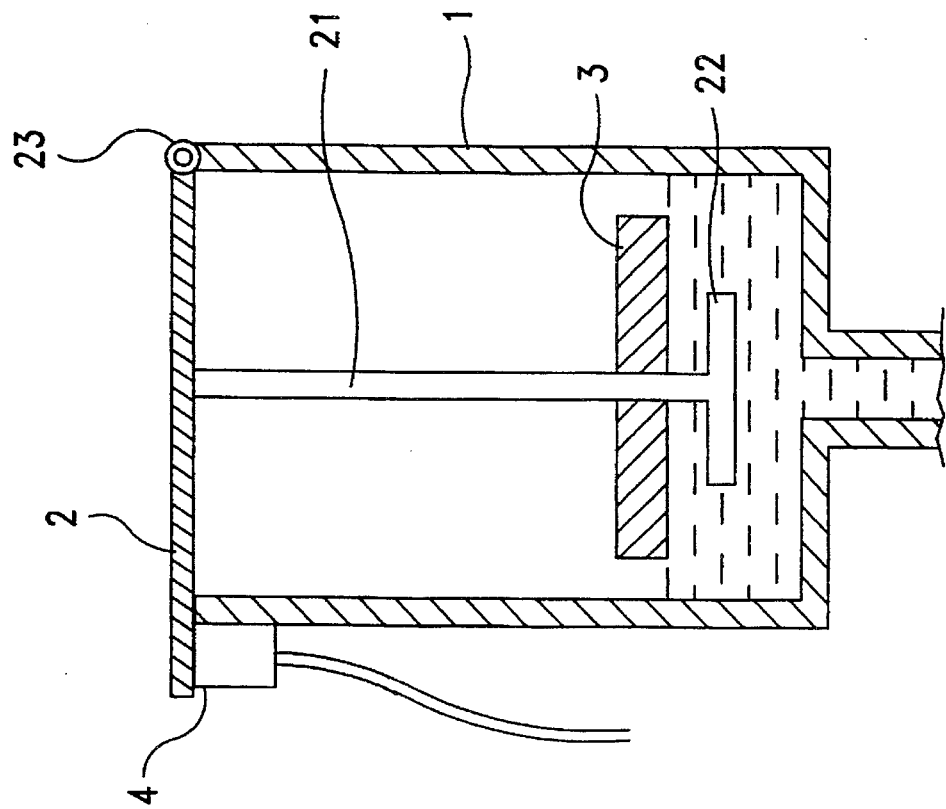
FIG. 2 is similar to FIG. 1 but showing the cover closed.

Referring to FIGS. 1 and 2, a microswitch 4 is mounted on the outside wall of the brake oil cup 1 of a motor vehicle brake system. A cover 2 is pivotably connected to the brake oil cup 1 by a pivot 23, having a downward guide rod 21 suspended in the brake oil cup 1 and terminating in a disk 22. A float 3 is mounted around the guide rod 21 and moved in the brake oil cup 1 between the disk 22 and the cover 2.

Figure 2A:
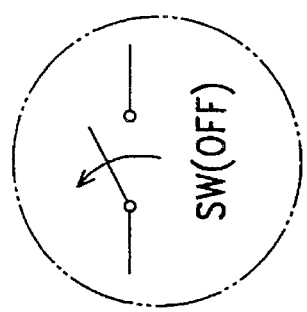
FIG. 2A is a circuit diagram showing the microswitch of FIG. 2 switched off.

When the brake oil cup 1 is filled up with the brake oil, the float 3 is moved upwards to lift the cover 2 from the microswitch 4, causing the microswitch 4 to be switched on (See FIG. 1A). On the contrary, when the float 3 is moved downwards from the cover 2 and the cover is covered on the brake oil cup 1, the microswitch 4 is switched off (see FIG. 2A).

Figure 3A:
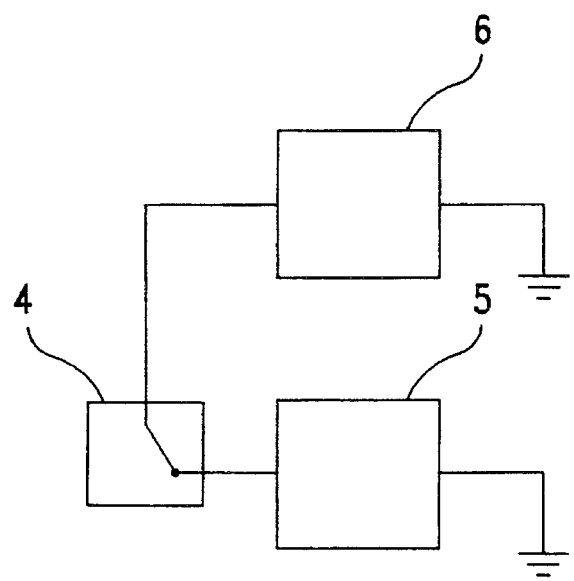
Figure 3B:
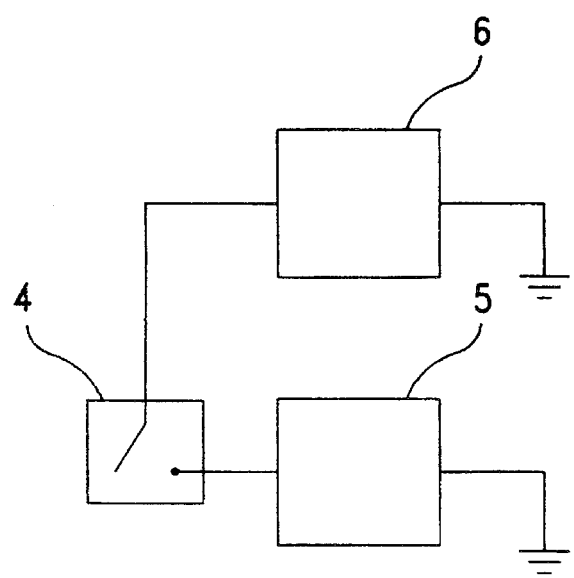
FIG. 3B is similar to FIG. 3A but showing the microswitch switched off.
Figure 4A:
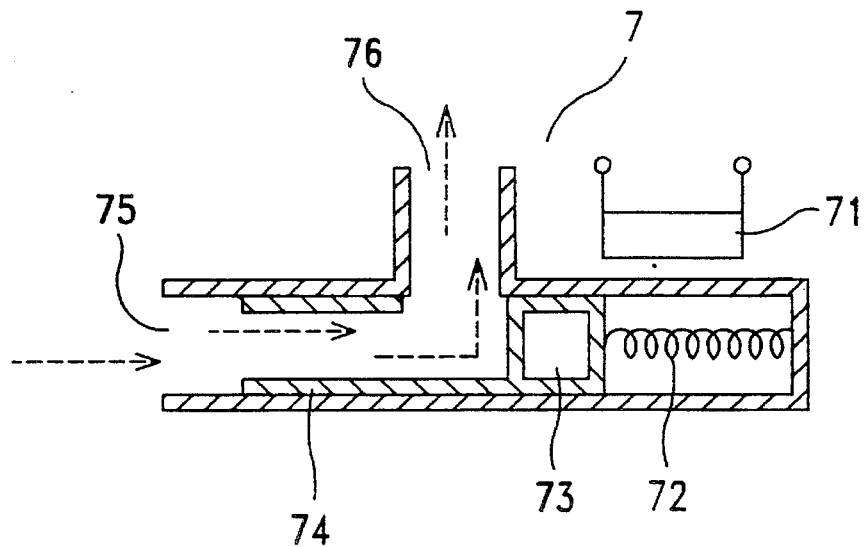
FIG. 4A is a sectional view of a oil damping device for a diesel engine according to the present invention.
Figure 4B:
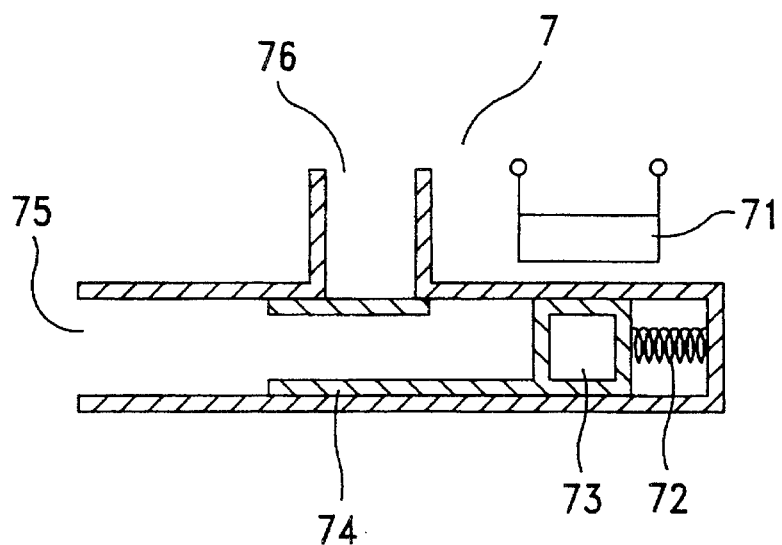
FIG. 4B is similar to FIG. 4A but showing the oil passage stopped.
Figure 5B:
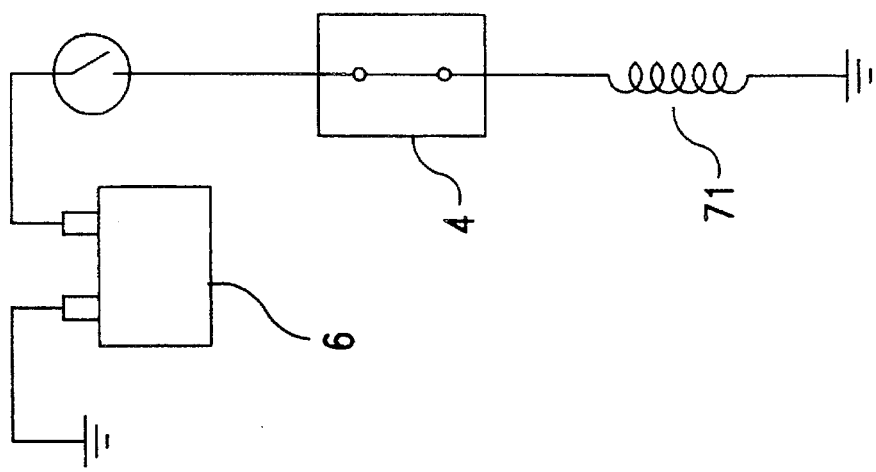
Figure 5A:
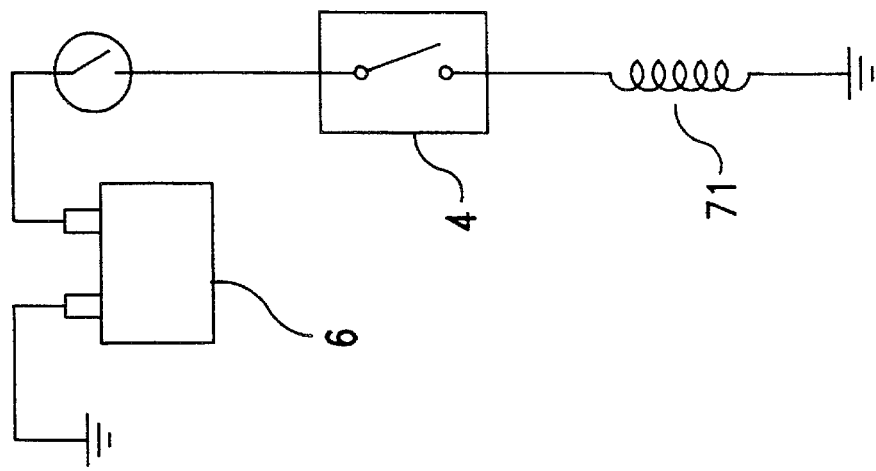
FIG. 5A is a circuit diagram of an alternate form of the present invention, showing the microswitch switched off.

Referring to FIGS. 3A, 3B and 1A again, the two opposite ends of the microswitch 4 are respectively connected to the ignition system 5 and the battery power supply 6 of the motor vehicle by electric wires. When the microswitch 4 is switched on, the ignition system 5 and the battery power supply 6 are electrically connected (see FIGS. 1A and 3A); when the microswitch 4 is switched off, the ignition system 5 and the battery power supply 6 are electrically disconnected (see FIGS. 2A and 3B). The lower limit of the float 3 is set at one fifth of the full brake oil level of the brake oil cup 1. Therefore, when the brake oil level drops below one fifth of the full brake oil level, the microswitch 4 is switched off, and the ignition system 5 is electrically disconnected from the battery power supply 6 to stop the engine.

FIGS. 4A, 4B, 5A, and 5B show another application example of the present invention installed in the oil damping device 7 of a diesel engine. The oil damping device 7 comprises an oil inlet 75 connected to the oil tank (not shown), an oil outlet 76 connected to an oil pump (not shown), an inner tube 74 moved on the inside, an electromagnet 73 connected to the inner tube 74 and controlled by a spring 72 and a winding 71 to move the inner tube 74 between the oil inlet 75 and the oil outlet 76. When the winding 71 does no work, the inner tube 74 is forced forward by the spring 72 to impart an oil passage between the oil inlet 75 and the oil outlet 76 (see FIG. 4A); when the winding 71 is energized to attract the electromagnet 73, the inner tube 74 is moved backward to block up the oil passage between the oil inlet 75 and the oil outlet 76 (see FIG. 4B). Therefore, when the microswitch 4 is electrically connected between the battery power supply 6 and the winding 71, the oil damping device can then be automatically controlled by the safety device of the present invention. When the microswitch 4 is switched off, the brake oil is allowed to pass through the oil damping device 7 (see FIG. 5A); on the contrary, when the microswitch 4 is switched on, the brake oil is not allowed to pass through the oil damping device 7 (see FIG. 5B) and the diesel engine is stopped.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the spirit and scope of the invention.

What is claimed is:

1. A brake oil level safety device for motor vehicles having switch means connected in series between an ignition system and a battery power supply of a motor vehicle, and control means disposed in a brake oil cup of an oil brake system of a motor vehicle and moved by brake oil in said brake oil cup to switch on said switch means when the level of said brake oil in said brake oil cup surpasses a predetermined range, and to switch off said switch means when the level of said brake oil in said brake oil cup drops below said predetermined range and characterized in said control means comprising a cover board pivoted to said brake oil cup, a downward guide rod extended from said cover board and suspended in said brake oil cup and terminating in a disk, and a float mounted around said guide rod and moved between said cover board and said disk.

2. A brake oil level safety device for motor vehicles having switch means connected in series between a battery power supply of a diesel car and an electromagnetic valve means, which controls an oil passage of an oil damping device of said diesel car, and control means disposed in a brake oil cup of an oil brake system of said diesel car and moved by brake oil in said brake oil cup to switch on said switch means when the level of said brake oil in said brake oil cup surpasses a predetermined range, and to switch off said switch means when the level of said brake oil in said brake oil cup drops below said predetermined range, and characterized in said control means comprising a cover board pivoted to said brake oil cup, a downward guide rod extended from said cover board and suspended in said brake oil cup and terminating in a disk, and a float mounted around said guide rod and moved between said cover board and said disk.

* * * * *